United States Patent [19]

Lekowski

[11] Patent Number: 5,573,325

[45] Date of Patent: Nov. 12, 1996

[54] MULTI-SENSORY THEATRICAL PRESENTATION STRUCTURE

[75] Inventor: Andrew J. Lekowski, Thousand Oaks, Calif.

[73] Assignee: Encountarium, Inc., Glendale, Calif.

[21] Appl. No.: 255,489

[22] Filed: Jun. 8, 1994

[51] Int. Cl.⁶ .................................................. G03B 21/28
[52] U.S. Cl. .................................................. 353/79; 353/28
[58] Field of Search ................................ 353/28, 30, 46, 353/50; 359/446, 458, 459, 630, 632, 633; 472/60, 61, 75; 352/89, 88

[56] References Cited

U.S. PATENT DOCUMENTS

| | | | |
|---|---|---|---|
| 486,606 | 11/1892 | Seymour | 352/89 |
| 663,267 | 12/1900 | Fitch . | |
| 700,381 | 5/1902 | Sherman . | |
| 1,189,799 | 7/1916 | Erickson . | |
| 1,295,374 | 2/1919 | Rockwell et al. . | |
| 1,422,149 | 7/1922 | Troeger . | |
| 1,775,237 | 9/1930 | Dawley et al. . | |
| 2,116,114 | 5/1938 | Guidorossi . | |
| 2,240,899 | 5/1941 | Armistead . | |
| 2,727,427 | 12/1955 | Jenkins | 353/28 |
| 3,035,836 | 5/1962 | McCulley | 353/28 |
| 3,085,799 | 4/1963 | Alswang . | |
| 3,442,508 | 5/1969 | Rudas . | |
| 3,473,428 | 10/1969 | Phillips . | |
| 3,945,132 | 3/1976 | Parmelee | 352/89 |
| 4,736,214 | 4/1988 | Rogers | 353/30 |
| 4,738,522 | 4/1988 | Lunde et al. | 352/28 |
| 4,805,895 | 2/1989 | Rogers . | |
| 4,962,420 | 10/1990 | Judeuich | 472/61 |

*Primary Examiner*—William Dowling
*Attorney, Agent, or Firm*—Kane, Dalsimer, Sullivan, Kurucz, Levy, Eisele and Richard, LLP

[57] ABSTRACT

A multi-sensory presentation structure for presenting a show composed of live action combined and superimposed with projected images includes a projector and a beam splitter formed of either a sheet of glass or a sheet of flexible film. The projector forms a still and/or moving image on the splitter which is superimposed on live action on a stage. The splitter can be undulated, shifted or pivoted back and forth toward the audience and/or the projector to provide very realistic visual effects. Preferably the projector is disposed above an area between the stage and the audience. The show is further enhanced by using speakers and olfactory devices to provide aural and olfactory stimuli to the audience coupled with the visual presentation.

23 Claims, 4 Drawing Sheets

1

MULTI-SENSORY THEATRICAL PRESENTATION STRUCTURE

BACKGROUND OF THE INVENTION a. Field of Invention

This invention pertains to a structure and arrangement for a multi-sensory presentation of entertainment and/or educational materials in a theatrical environment.

b. Background of the Invention

Cinemagraphic and video projections are now frequently combined with live performances to add a sense of realism to theatrical presentation. In this patent application the term 'live performance' shall refer to sequential choreographed movement by figures on a stage, preferably in conjunction with props disposed thereon. The figures may be actors or mechanical figures, i.e. puppets or robots. Previously these projections were two dimensional and could not be combined with the live performance in a manner that looks convincing to the audience nor were they able to move about objects positioned in front of them or between the images and the audience area. In addition most presentations involved only visual and aural stimuli and hence the audience's experience of the presentation was very limited.

OBJECTIVES AND SUMMARY OF THE INVENTION

In view of the above disadvantage of the prior art, it is objective of the present invention to provide a structure capable of combining a live performance with three dimensional imagery.

A further objective is to provide a structure wherein in addition to visual stimuli, the audience is subjected to various other stimuli including audio, olfactory, apparent motion and so forth which makes a presentation much more stimulating and believable, Other objectives and advantages of the invention shall become apparent from the following description. Briefly, a multi-sensory theatrical presentation structure constructed in accordance with this invention includes a stage for presentation of a live performance, an audience area from which an audience can experience a presentation and projecting means for projecting an image, still or moving, superimposed on the live performance. The projection means includes an image projector for generating the image and first surface mirrors, a fabric screen and a beam splitting screen receiving said image, said screen including an image receiving surface formed either of glass or a flexible film. The beam splitting screen may be moved away to an idle position either during or after a performance. During performance, the image receiving surface or the fabric screen can be shifted toward or away from the projector or in relation to the beam splitting screen to provide a three dimensional effect. The structure may also include olfactory devices for providing olfactory stimulation and a speaker system for providing multi-track stereo sounds. Additionally, the audience may be seated on a movable platform which can be reciprocated or rotated during the performance to provide additional realistic effects.

DETAILED DESCRIPTION OF THE INVENTION

Figure 1:
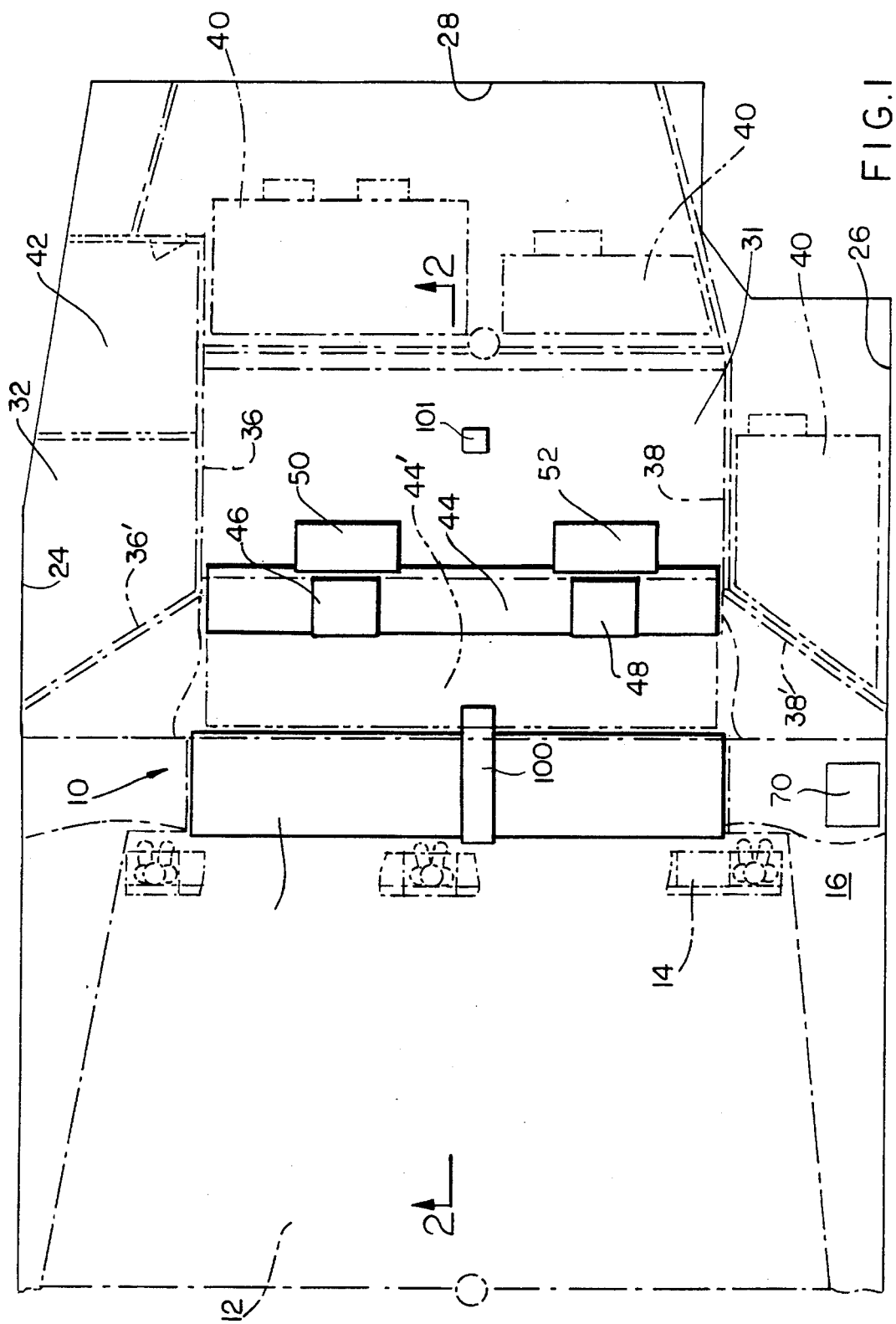
FIG. 1 shows a plan view of a theatrical presentation structure constructed in accordance with this invention.

Referring now to the figures a theatrical presentation structure 10 constructed in accordance with this invention includes an audience area such as a platform 12 supporting chairs 14 or other support means on which an audience can rest during a performance. The platform may be secured to the floor 16 or may be moved in one or more directions in an oscillatory motion or turned by a driver mechanism 18. Disposed on top of platform 12 is a semitranslucent screen or scrim 20 suitable for back projection as described more fully below.

In front of the platform 12 there is a stage area 22 defined between two side walls 24, 26 extending toward the platform 12 and a back wall 28. The stage area may be partitioned so that it is formed with a central zone 31 with two lateral zones 32, 34 defined by side walls 36, 38 respectively. Various props 40 may be positioned on the stage central zone as well as in lateral zones 32, 34. A section of the stage 22 and area behind walls 36, 38 may be turned into a storage closet 42 for storing puppets or robots between performances.

Figure 2:
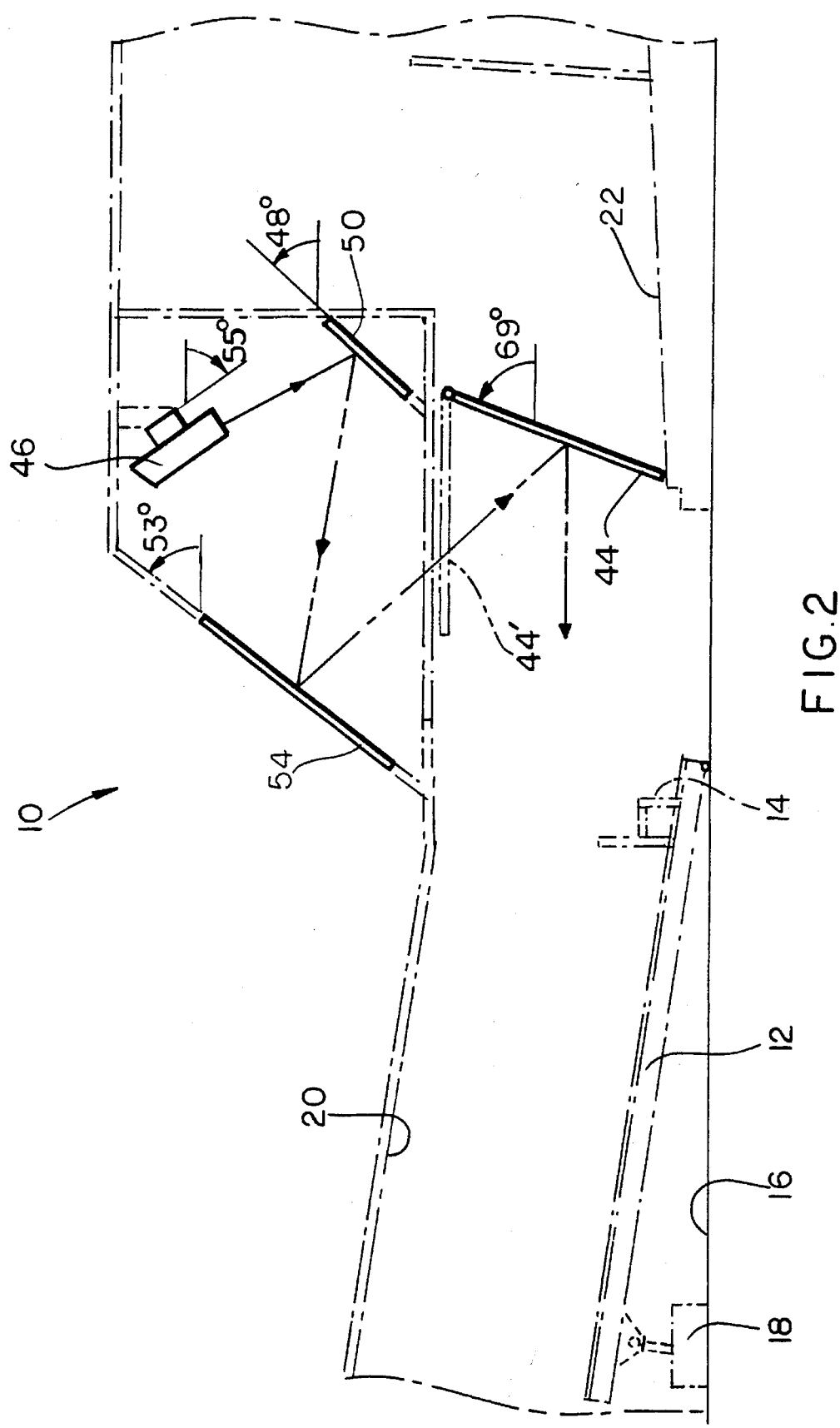
FIG. 2 shows an elevational view of the structure of FIG. 1.

A beam splitter 44 is positioned in front of the stage 22. Preferably splitter 44 is disposed at about an angle of about 69° from the horizontal plane as shown in FIG. 2 and is made of a sheet of glass treated so that it is partially reflective and partially transmissive. Alternatively, the beam splitter may comprise a thin flexible material or transparent or semi-transparent film such as a Mylar®. With proper illumination the audience on platform 12 can see the stage 22 including the props 40 and any actors or animated figures performing a live performance thereon. In addition the audience also perceive an image (still or moving) reflected by the splitter 44 so that this image projected onto the splitter 44 is superimposed on the live performance taking place on the stage 22.

The projecting means for projecting the image on splitter 44 is preferably positioned between the stage 22 and audience area. This projecting means includes a pair of projectors 46, 48, a pair of flat mirrors 50, 52 and a front projection screen 54. Projectors 46, 48 are arranged to bounce their images off mirrors 50 or 52 which reflect the images to a solid, non-light-transmitting screen (or screens) 54. The screen 54 is positioned so that the image formed thereon and originating from the projectors 46, 48 is reflected by the beam splitter 44 toward the audience on platform 12. Preferably, in order to achieve this result, the projectors are oriented so that they project images at an angle of about 55° from a horizontal plane, while mirrors 50, 52 are oriented at an angle of 48° and front projection screen 54 is oriented at an angle of 53° from the horizontal plane. Importantly the projectors 46, 48 and screen 54 are disposed above an area disposed between the stage and the audience. A decorative panel or other wall means may be used to cover the projectors 46, 48. Of course other arrangements and projection means may be used as well to generate an image for reflection by beam splitter screen 44. The beam splitter 44 in front of audience 12 is placed in such a manner that the audience can see the reflection of the solid imagery (on screen 54) superimposed on the stage area 22. The screen is preferably formed of fabric but may also be a free-form solid surface with different areas disposed in different planes from the audience. As a result a "ghost" moving across the screen would also appear to move toward or away from the audience.

In addition to the components described above, additional components are added to the structure 10, which components have been omitted from the drawings for the sake of clarity. These additional components include a speaker system for providing high quality surround sound, image generating means for selectively generating an image onto the scrims 20, 36 and 38, olfactory apparatus 70 for providing olfactory stimuli for the audience, electromechanical means for moving puppets, robots or props on the stage 22 and so on.

Figure 3:
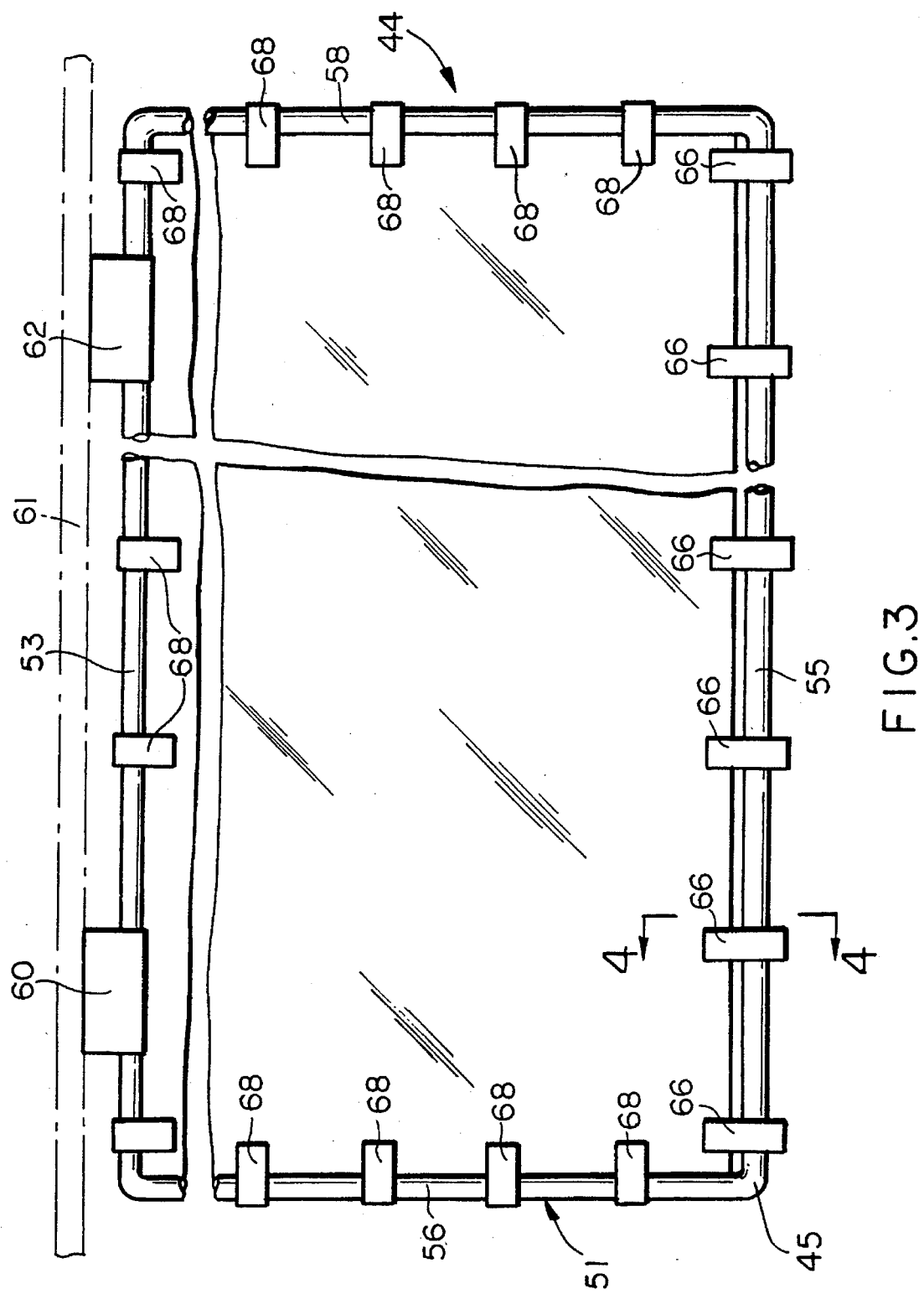
FIG. 3 shows a side elevational view of the beam splitter and its frame for the structure of FIGS. 1 and 2.
Figure 4:
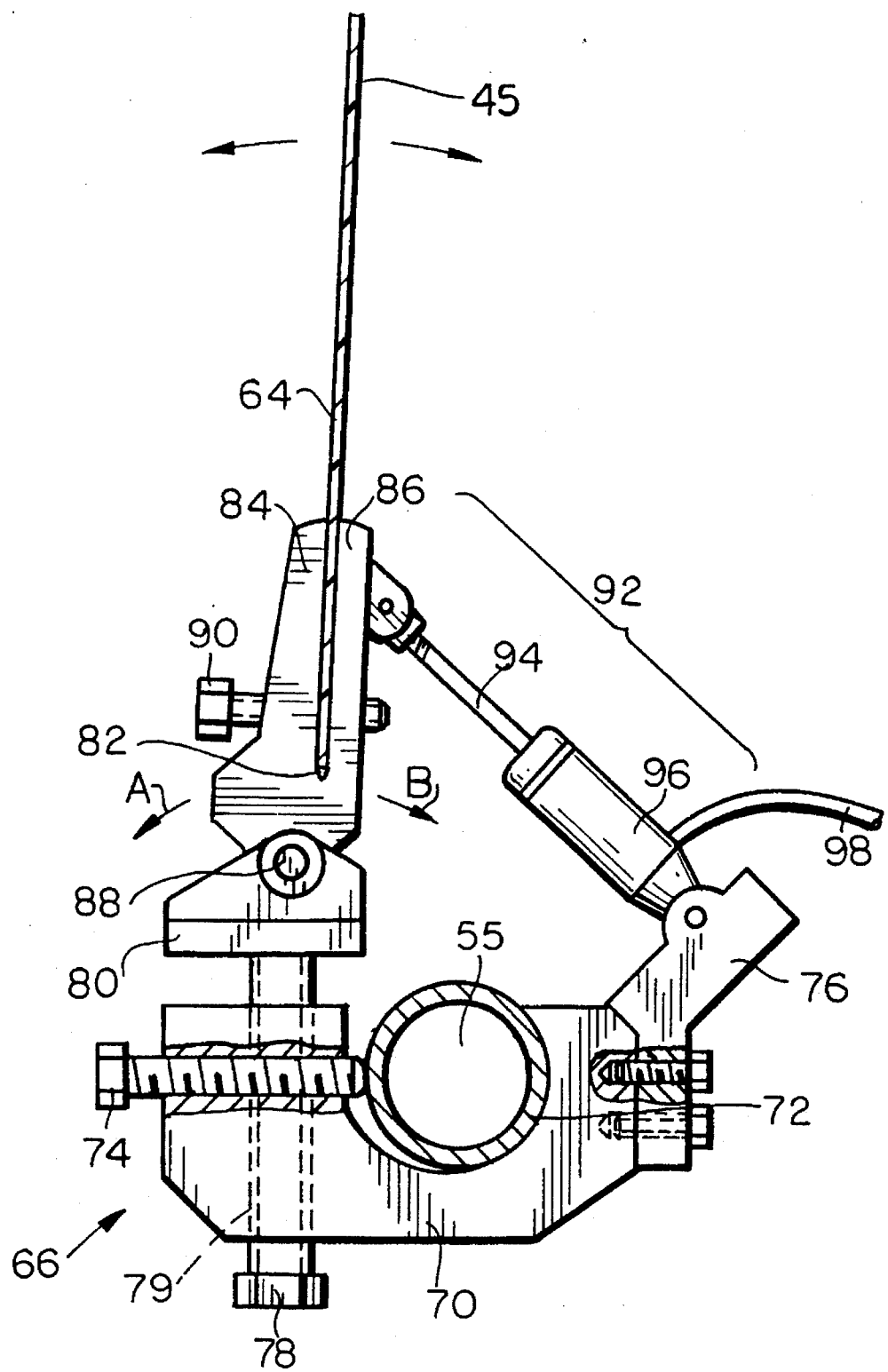
FIG. 4 shows an enlarged partial sectional view of the frame of FIG. 3 taken along lines 4—4.

Importantly, the beam splitter 44 can be manipulated in various ways to obtain novel affects which were not previously achievable. For this purpose, as shown in FIGS. 3 and 4 the beam splitter 44 is supported on a frame 51 composed of two horizontal frame members 53, 55 and two vertical frame members 56, 58. The frame members 53, 55, 56, 58 may be tubular. The frame 51 is supported on the ceiling 61 above the stage 22 by supports 60, 62. These supports may be arranged to position the frame 51 selectively in a first and a second position. In the first position shown in FIGS. 1 and 2 the beam splitter 44 is disposed at an angle as discussed above with respect to the horizontal plane so that it can reflect the image from screen 54 toward the audience on platform 12. In its second position, the beam splitter 44' (shown by dotted lines in FIG. 2) is disposed substantially horizontally adjacent to ceiling 61 so that it is idle. For this purpose the supports 60, 62 may be pivot frame 51 about the longitudinal axis of frame member 53 using well known electromechanical or pneumatic means.

A film 45 forming splitter 44 may be supported on frame 51 by a plurality of clamps 66, 68 attached to frame members 53, 55, 56, 58. Details of clamps 66 are shown in FIG. 4 for securing the bottom edge 64 of the film 45. Each clamp 66 is formed of a C-shaped body 70 forming a jaw 72 for embracing a portion of frame member 55. A screw 74 is disposed opposite jaw 72 to secure the clamp 66 to the frame member 55 as shown. On one side, clamp body 70 supports a bracing bracket 76. On the opposite side, body 72 is provided with an extended screw 78 threaded into a hole 79. The end of the screw 78 is captured by a member 80. An arm 82 with two fingers 84, 86 extends above member 80. The arm 82 is mounted on member 80 by a hinge 88. The spacing between fingers 84, 86 is adjusted by a screw 90 to capture the edge 64 of glass sheet or film 45.

A cylindrical actuator 92 is used to couple arm 82 to bracing bracket 76. The cylindrical actuator includes a piston rod 94 having one end pivotably attached to finger 86 and another end (not shown) disposed inside a cylinder 96. The cylinder 96 is filled with a fluid and its internal pressure is controlled through a control tube 98 coupled to a remote control apparatus (not shown). Increasing or decreasing the pressure within the cylinder 96 causes the rod 94 to extend or retract which in turn forces the arm 82 to pivot around hinge 88 either clockwise or counter clockwise, as shown by arrows A and B.

The clamps 68 disposed on frame members 53, 56 and 58 are similar to clamp 66 shown in FIG. 4 except that the film 45 is held rigidly and therefore hinge 88 is omitted and actuator 92 is replaced by a rod having a preselected fixed length.

During a multi-sensory presentation, while audience is seated on platform 12, live performance takes place on stage 22 including its center zone 31 and selectively on the lateral zones 32, 34. The action in the lateral zones may be made visible by providing scrim portions 36' and 38' of side walls 36, 38 by changing the relative intensity light levels on the stage 22. As previously mentioned either live actors, puppets or robots may be used for the live performance. Concurrently with this performance, music and other sound programming is provided to the audience through the speaker system surrounding the audience, the platform 12 may be moving and the olfactory devices may also be activated. Simultaneously, projectors 46, 48 project still or moving image on beam splitter 44 via mirror 50 and front projection screen 54. The images from these projectors are superimposed or blended with the live performance on the stage 22 as viewed by the audience to provide a very realistic three-dimensional effect. This effect is enhanced if a film is used by moving all or a portion of the film 45 of beam splitter 44 using the pivotable clamps 66 as described above. Alternatively, or additionally the whole frame may be shifted toward or away from the audience using well-known electro-mechanical activators (not shown). During or immediately after the presentation is completed the beam splitter may be slid away to a horizontal position 44' adjacent to the ceiling by supports 60, 62 through appropriate mechanical means.

The structure described herein has numerous advantages over the prior art. By positioning the projectors at a location above and between the stage and the audience, and folding the optical paths between the projectors and the screen, no masking means are required above the audience. In addition the space above the audience now becomes available for other optical effects. Using a sheet of glass or a thin plastic film for the beam splitter screen allows for a cost effective, quick, selective, subtle and dramatic removal of the splitter from the stage area so that its location can be occupied by a show-host, live-action characters and even the audience. Thus, a heightened and mysterious effect is achieved.

Additional special effects may be achieved if a flexible film is used. More specifically undulating the film along its bottom, moving the film toward or away from the audience, and fluttering or shaking a portion of the film give the image a three dimensional realistic images of for example fire, water, ghosts and so on which is not achievable with a stationary splitter. Further, a prop or column 100 may be provided in front of the audience as shown in FIG. 4. A corresponding prop 101 is positioned on stage in line with prop 100. The audience sees a correct visual placement of the prop on stage but, in fact is viewing an image of the prop superimposed over the on-stage prop. This permits a "ghost" to "walk" behind props which are positioned on stage.

Movement of the splitter toward or away from the projector further creates the impression that the image on the film interacts with the characters on the stage along not one, as in the case with a stationary splitter, but several planes.

The present arrangement makes use of front projection. These types of images are inherently clearer and brighter than rear projected images. Moreover the arrangement leaves a clear space in front of the audience for the live action by full scale characters. Further, if desired multiple projection/ghost setups may be repeated one in front of the other to create multiple planes of ghosts. In addition, more than two projectors can be used for a wider area of imagery.

With the relatively small size of the mirror/projection setup disclosed, the theater can be built into a transportable container for use as a portable show.

Obviously numerous modifications may be made to this invention without departing from its scope as defined in the appended claims.

We claim:

1. A theatrical presentation structure comprising:

a stage;

an audience area;

a screen disposed between said stage and audience area, said screen having areas in different planes closer and further from said audience area;

projecting means for projecting a frontal image on said screen, said projecting means being disposed above said screen; and beam splitting means disposed between said stage and screen for receiving and projecting said image toward a front of said stage.

2. The structure of claim 1 further comprising means for moving said screen toward and away from said projection means;

3. The structure of claim 1 further comprising moving means for moving said beam splitting means toward and away from said audience area.

4. The structure of claim 1 wherein said beam splitting means comprises a sheet of glass.

5. The structure of claim 1 wherein said beam splitting means comprises a sheet of flexible film.

6. The structure of claim 1 further comprising moving means for moving said beam splitting means for obtaining a rippling effect of said image.

7. The structure of claim 1 further comprising a prop disposed between said screen and said beam splitter and a corresponding prop on stage.

8. A theatrical presentation structure comprising:

a stage;

projecting means for projecting an image toward said stage; and beam splitting means disposed between said stage and said projecting means for projecting said image toward a front of said stage, said beam splitting means including a beam spitting screen defined by a flexible film.

9. The structure of claim 8 wherein said projecting means is disposed above said beam splitting means.

10. The structure of claim 8 further comprising positioning means for positioning said beam splitting means to an idle position.

11. The structure of claim 8 further comprising shifting means for selectively shifting of said film.

12. The structure of claim 8 further comprising an audience .area from where an audience views said stage, with said image being visually superimposed on said stage.

13. The structure of claim 8 further comprising means for moving said screen toward and away from said projection means.

14. The structure of claim 8 further comprising a prop disposed between said screen and said beam splitter and a corresponding prop on stage.

15. A multi-media theatrical presentation structure comprising:

an audience area for holding an audience;

a stage for presenting a live performance, said stage including a center zone and several lateral zones separated from said center zone by scrims;

sensory means for providing sensory impressions to said audience associated with said live performance, said sensory means including an imaging screen, projecting means for projecting an image on said imaging screen and a beam splitter for projecting said image to said audience, said image as viewed by said audience being superimposed on said stage, wherein said projecting means is disposed at allocation between said stage and said audience.

16. The structure of claim 15 wherein said beam splitter screen includes a projecting surface defined by a flexible film.

17. The structure of claim 15 further including means for moving said beam splitter toward and away from said audience.

18. The structure of claim 15 further comprising means for moving said beam splitter toward and away from said projecting means.

19. The structure of claim 15 wherein said sensory means further includes olfactory devices for providing olfactory stimuli to said audience.

20. The structure of claim 15 wherein said projecting means further includes positioning means for shifting said beam splitter between an active position wherein said image is intercepted by said beam splitter and an idle position.

21. The structure of claim 15 further comprising shifting means for shifting a portion of said beam splitter reciprocatingly toward and away from said audience to obtain a fluttering of said image.

22. The structure of claim 15 wherein said beam splitter is disposed between said stage and said audience, 23. The structure of claim 15 further comprising a prop disposed between said screen and said beam splitter and a corresponding prop on stage.

* * * * *